(12) United States Patent
Dippel et al.

(10) Patent No.: US 9,466,437 B2
(45) Date of Patent: Oct. 11, 2016

(54) ELECTROLYTE ADDITIVE FOR A LITHIUM-BASED ENERGY STORAGE DEVICE

(71) Applicants: WESTFÄLISCHE WILHELMS-UNIVERSITÄT MÜNSTER, Münster (DE); JACOBS UNIVERSITY BREMEN GGMBH, Bremen (DE)

(72) Inventors: Christian Dippel, Münster (DE); Alexandra Lex-Balducci, Münster (DE); Martin Winter, Münster (DE); Miriam Kunze, St. Andreasberg (DE); René Schmitz, Mannheim (DE); Romek Ansgar Müller, Bad Bentheim (DE); Stefano Passerini, Münster (DE); Nataliya Kalinovich, Bremen (DE); Gerd-Volker Röschenthaler, Bremen (DE); Tobias Böttcher, Bremen (DE)

(73) Assignee: WESTFALISCHE WILHELMS-UNIVERSITAT MUNSTER, Munster (DE)

( * ) Notice: Subject to any disclaimer, the term of this patent is extended or adjusted under 35 U.S.C. 154(b) by 127 days.

(21) Appl. No.: 14/355,654

(22) PCT Filed: Oct. 31, 2012

(86) PCT No.: PCT/EP2012/071544
§ 371 (c)(1),
(2) Date: May 1, 2014

(87) PCT Pub. No.: WO2013/064530
PCT Pub. Date: May 10, 2013

(65) Prior Publication Data
US 2015/0099165 A1   Apr. 9, 2015

(30) Foreign Application Priority Data

Nov. 4, 2011   (DE) .................. 10 2011 055 028

(51) Int. Cl.
H01G 11/60 (2013.01)
H01M 10/052 (2010.01)
H01M 10/0525 (2010.01)
H01M 10/0567 (2010.01)
H01M 10/42 (2006.01)

(52) U.S. Cl.
CPC ........... H01G 11/60 (2013.01); H01M 10/052 (2013.01); H01M 10/0525 (2013.01); CPC ... H01M10/0567 (2013.01); H01M 10/4235 (2013.01); H01M 2300/0025 (2013.01); H01M 2300/0034 (2013.01); Y02E 60/122 (2013.01)

(58) Field of Classification Search
CPC ......... H01M 10/052; H01M 10/0525; H01M 10/0567; H01M 10/4235
See application file for complete search history.

(56) References Cited

U.S. PATENT DOCUMENTS 6,319,428 B1   11/2001 Michot et al.
6,620,546 B1   9/2003 Michot et al.
(Continued)

FOREIGN PATENT DOCUMENTS

CA      2321373        3/2001
DE      000069715361 T2   4/2003
(Continued)

OTHER PUBLICATIONS

International Search Report issued in corresponding International Application No. PCT/EP2012/071544, dated Jun. 3, 2013.
(Continued)

*Primary Examiner* — Helen O Conley
(74) *Attorney, Agent, or Firm* — Davidson, Davidson & Kappel, LLC

(57) ABSTRACT

The invention relates to an electrolyte for a lithium-based energy storage device comprising at least one lithium salt, a solvent and at least one compound of general formula (1), and to their use in lithium-based energy storage devices.

20 Claims, 6 Drawing Sheets

(56) References Cited

U.S. PATENT DOCUMENTS

2002/0055045 A1    5/2002    Michot et al.
2011/0128674 A1    6/2011    Michot et al.

FOREIGN PATENT DOCUMENTS

| | | |
|---|---|---|
| DE | 000069934170 T2 | 9/2007 |
| EP | 0759641 | 2/1997 |
| EP | 000000902492 A1 | 3/1999 |
| EP | 000001088814 A1 | 4/2001 |
| EP | 000001557899 A2 | 7/2005 |
| EP | DE000069829955 T2 | 3/2006 |
| WO | WO 9928987 A1 | 6/1999 |

OTHER PUBLICATIONS

Watanabe Y et al: "Organic compounds with heteroatoms as overcharge protection additives for lithium cells", Journal of Power Sources, Elsevier SA, CH, Bd. 160, Nr. 2. Oct. 6, 2006, Seiten 1375-1380, XP027938192, ISSN: 0378-7753 [gefunden am Oct. 6, 2006].

ELECTROLYTE ADDITIVE FOR A LITHIUM-BASED ENERGY STORAGE DEVICE

This application is a U.S. national phase application under 35 U.S.C. of §371 of International Application No. PCT/EP/2012/071544, filed on Oct. 31, 2012, which claims priority to DE 102011 055 028.3, filed on Nov. 4, 2011, the disclosures of which are all hereby incorporated by reference herein.

FIELD OF THE INVENTION

The invention relates to an electrolyte especially suitable for lithium-based energy storage means.

BACKGROUND OF THE INVENTION

Lithium ion technology is the leading technology in the field of rechargeable battery storage systems for portable electronics. Lithium ion batteries are being used as storage systems in mobile phones, camcorders and laptops, and have also been used for a while in battery-powered tools. The next step intended is the use of lithium ion batteries in larger systems, such as in automobiles or as stationary energy storage means for renewable energies. Because of the high cell voltage, their superior energy density and power density, and their notably low self-discharge, lithium ion batteries have a high potential for these applications. However, commercially available batteries still do not meet the elevated safety demands for large systems.

An important role is played here by the prevention of battery overcharging. In contrast to conventional batteries with aqueous electrolytes, such as the so-called lead accumulators, nickel-cadmium batteries or nickel-metal hydride batteries, lithium ion batteries having organic or polymeric electrolytes do not have any internal overcharge prevention. This prevention is guaranteed in the form of electronic control in the normal operation, for example, of an automobile by the battery management system (BMS). This monitors the voltage and temperature of each individual cell in the battery. In the event of failure of this system, however, overcharging of individual cells in the battery is possible and, as a result of this, overheating and explosion of the entire battery, since the rising temperature causes electrolyte components to become gaseous, and they can self-ignite. It is therefore necessary to integrate a further overcharge preventer into lithium ion batteries, which prevents the battery from overcharging in the event of failure of the external electronic control mechanisms.

An additional, internal overcharge preventer may be present in the form of a separator or of an additional layer within the battery, which melts when a particular temperature is exceeded and hence stops the current density flow. However, this offers prevention only from a critical point at which the overcharging process has already set in. Therefore, an overcharge preventer that prevents the overcharging process before there is a temperature rise, which is always of concern from a safety point of view, should be used. This can be achieved by means of electrolyte additives which, when there is a threat of overcharging, enter into an oxidation reaction and hence consume the charging current density. In this period, the charging current density is required for the reaction of the additive and the battery is not charged any further, as a result of which the voltage does not rise any further and hence the overcharging process is prevented.

These additives can be divided into two groups: the "redox shuttles" can be oxidized at the cathode and then reduced again at the anode to give the original additive, which means that they can be oxidized again at the cathode. However, this cycle is not implementable in practice, since the additive is consumed by other side reactions. A further great disadvantage is the low potentials at which many redox shuffle additives react.

A further group is that of the "non-redox shuttles". This type of additives enters only into an oxidation reaction during the charging process, with consumption of the additive. The charging current density is required for decomposition and the battery is protected. The decomposition stops the battery operation and continuation of the cycling is not possible.

The best-known representative of this group is the molecule biphenyl, as disclosed, for example, in the document EP 0759641. A disadvantage of the use of biphenyl is, however, that the addition of biphenyl, even at a low concentration, has adverse effects on the battery properties. Furthermore, there are concerns that the presence of biphenyl in a fully charged cell, if it is stored over a prolonged period, will likewise exert an adverse effect on the battery properties. The potential of a fully charged cell is 4.3 V against Li/Li$^+$. However, biphenyl has an oxidation shoulder of 4.3 V against Li/Li$^+$. There is therefore a risk that there will be a slow but steady oxidation of biphenyl in the course of storage of a fully charged cell.

SUMMARY OF THE INVENTION

It was therefore an object of the present invention to provide a compound that overcomes at least one of the aforementioned disadvantages of the prior art. More particularly, it was an object of the present invention to provide a compound suitable as an overcharge preventer.

This object is achieved by an electrolyte for a lithium-based energy storage means, comprising at least one lithium salt, a solvent and at least one compound of the general formula (1) as shown below

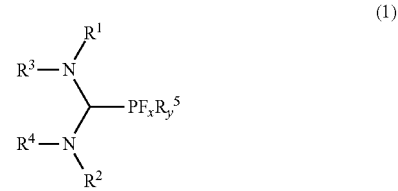

(1)

wherein:
R$^1$, R$^2$ are the same or different and are each independently selected from the group comprising C$_{1-6}$-alkyl, C$_{3-7}$-cycloalkyl and/or C$_6$-C$_{10}$-aryl;
R$^3$, R$^4$ are the same or different and are each independently C$_{1-6}$-alkyl, unsubstituted or mono- or polysubstituted by at least one substituent selected from the group comprising F, C$_{1-4}$-alkyl, carbonyl oxygen and/or C$_{1-4}$-alkoxy, or R$^3$ and R$^4$ form a saturated 5- or 6-membered ring which is unsubstituted or mono- or polysubstituted by at least one substituent selected from the group comprising F, C$_{1-4}$-alkyl, carbonyl oxygen and/or C$_{1-4}$-alkoxy;
R$^5$ is linear or branched C$_{1-4}$-alkyl, unsubstituted or mono- or polysubstituted by fluorine;
x is 3, 4 or 5;
y is 0, 1 or 2.

It has been found that, surprisingly, compounds of the general formula (1) in electrolytes for lithium ion batteries can provide prevention of overcharging. More particularly, compounds of the general formula (1) do not react until a higher potential than those that are attained in the normal charging process of the battery. It is highly advantageous in this context that the compounds of the general formula (1) feature a higher oxidation potential than biphenyl. This enables the charging of the battery up to higher potentials without setting off the overcharge preventer, which increases the operation window of the battery. The higher potentials result in a higher energy density of the battery.

It is also advantageous that the compounds of the general formula (1) do not affect the normal charging and discharging processes, which means that the normal battery operations are not adversely affected.

The term "$C_1$-$C_6$-alkyl" encompasses, unless stated otherwise, straight-chain or branched alkyl groups having 1 to 6 carbon atoms. The term "$C_6$-$C_{10}$-aryl" is understood to mean aromatic radicals having 6 to 10 carbon atoms. Term "aryl" preferably encompasses carbocycles. $C_6$-$C_{10}$-Aryl groups are preferably selected from the group comprising phenyl and/or naphthyl, preferably phenyl groups. $C_3$-$C_7$-Cycloalkyl groups are preferably selected from the group comprising cyclopentyl and/or cyclohexyl.

Preferably, $R^1$ and $R^2$ are unsubstituted. $R^1$ and $R^2$ comprise preferably linear or branched $C_1$-$C_6$-alkyl. Preferably, $R^1$ and $R^2$ are the same or different and are each independently straight-chain or branched alkyl groups having 1 to 4 carbon atoms, especially selected from the group comprising methyl, ethyl, propyl, isopropyl, butyl, isobutyl, pentyl, isopentyl and/or neopentyl. In preferred embodiments, $R^1$ and $R^2$ are the same or different and are each independently linear or branched $C_1$-$C_4$-alkyl, preferably $C_1$-$C_2$-alkyl. Preferably, $R^1$ and $R^2$ are the same or different and are each independently methyl or ethyl, more preferably methyl. In an advantageous manner, small alkyl groups $R^1$ and $R^2$ can lead to compounds of the general formula (1) which are oxidized at higher potentials.

Further preferably, $R^1$ and $R^2$ may be selected from the group comprising cyclopentyl and/or cyclohexyl, preferably cyclohexyl.

$R^1$ and $R^2$ may further be selected from the group comprising phenyl and/or naphthyl, preferably phenyl.

$R^3$ and $R^4$ may especially be linear or branched $C_1$-$C_6$-alkyl. Preferably, $R^3$ and $R^4$ are the same or different and are each independently straight-chain or branched alkyl groups having 1 to 4 carbon atoms, especially selected from the group comprising methyl, ethyl, propyl, isopropyl, butyl, isobutyl, pentyl, isopentyl and/or neopentyl.

$R^3$ and $R^4$ may be unsubstituted or mono- or polysubstituted by at least one substituent selected from the group comprising F, $C_{1-4}$-alkyl, carbonyl oxygen and/or $C_{1-4}$-alkoxy. More particularly, $R^3$ and $R^4$ may be mono- or polysubstituted, especially di-, tri- or tetrasubstituted, by fluorine. Preferably, $R^3$ and $R^4$ may be the same or different and are each independently selected from the group comprising $CH_2F$, $C_2H_4F$, $C_2H_3F_2$ and/or $C_2H_2F_3$.

In preferred embodiments, $R^3$ and $R^4$ are the same or different and are each independently linear or branched $C_{1-4}$-alkyl, preferably $C_{1-2}$-alkyl. Preferably, $R^3$ and $R^4$ are the same or different and are each independently methyl or ethyl, more preferably methyl.

It may be preferable for $R^1$, $R^2$, $R^3$ and $R^4$ to be the same, especially linear or branched $C_{1-4}$-alkyl, preferably $C_{1-2}$-alkyl. Preferably, $R^1$, $R^2$, $R^3$ and $R^4$ are methyl or ethyl, more preferably methyl.

In preferred embodiments, $R^3$ and $R^4$ form a saturated 5- or 6-membered ring which may be unsubstituted or mono- or polysubstituted by at least one substituent selected from the group comprising F and/or $C_{1-4}$-alkyl.

In this embodiment, $R^3$ and $R^4$ together preferably correspond to structures selected from the group comprising —$CH_2$—$CH_2$—$CH_2$— and —$CH_2$—$CH_2$—.

Preferably, $R^3$ and $R^4$ form a saturated 5- or 6-membered ring. Preferred saturated 5- or 6-membered ring structures that $R^3$ and $R^4$ can form together with the nitrogen atoms to which they are bonded are tetrahydroimidazole derivatives.

In embodiments in which $R^3$ and $R^4$ form a 5- or 6-membered ring, this ring is preferably unsubstituted. Alternatively, a 5- or 6-membered ring may be mono- or polysubstituted on the ring carbon atoms by at least one substituent selected from the group comprising F and/or $C_{1-4}$-alkyl.

In embodiments in which $R^3$ and $R^4$ form a 5- or 6-membered ring, $R^1$ and $R^2$ are preferably linear or branched $C_1$-$C_4$-alkyl, especially $C_{1-2}$-alkyl, preferably methyl or ethyl, more preferably methyl, or phenyl.

The compound of the general formula (1) has a $PF_xR^5_y$ substituent where x is 3, 4 or 5 and y is correspondingly 2, 1 or 0. Particular preference is given to the $PF_xR^5_y$ substituent where x is 5 and y is 0, meaning $PF_5$.

It may, however, also be preferable for one or two fluorine atoms to be replaced by a linear or branched $C_{1-4}$-alkyl, especially $C_{1-2}$-alkyl, unsubstituted or mono- or polysubstituted by fluorine. In preferred embodiments too, $R^5$ is therefore selected from the group comprising $CH_3$, $CH_2F$, $CHF_2$, $CF_3$, $C_2H_5$, $C_2H_4F$, $C_2H_3F_2$, $C_2H_2F_3$, $C_2HF_4$ and/or $C_2F_5$. Preferably, $R^5$ is selected from the group comprising $CH_3$ and/or $CF_3$.

In very preferred embodiments, the at least one compound of the general formula (1) is selected from the group comprising compounds of the formulae (2) and/or (3) below:

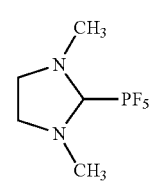

(2)

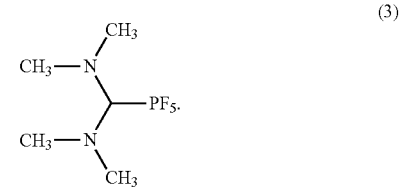

(3)

In an advantageous manner, particularly the compound of the formula (2) in an electrolyte does not exhibit oxidation until higher potentials than those that are normally attained in the normal charging process of the battery.

The compounds of the general formula (1) are preparable by standard methods familiar to those skilled in the art.

The electrolyte includes at least one lithium salt, a solvent and at least one compound of the general formula (1).

In preferred embodiments, the concentration of the at least one compound of the general formula (1) in the electrolyte is in the range from ≥0.001 M to ≤1 M, preferably in the range from ≥0.01 M to ≤0.5 M, more preferably in the range from ≥0.05 M to ≤0.2 M. For example, the concentration of the at least one compound of the general formula (1) in the electrolyte may be 0.1 M.

In an advantageous manner, an electrolyte comprising ≥0.001 M to ≤1 M of a compound of the general formula (1), especially of the formulae (2) or (3), can provide good prevention of overcharging in a lithium ion battery. More particularly, these concentrations do not affect the normal charging and discharging processes. This has the advantage that the normal battery operations are not adversely affected thereby.

An electrolyte brings about charge transport in lithium-based electrochemical energy storage means. The electrolyte therefore preferably comprises a conductive lithium salt dissolved in a solvent. Suitable solvents are, for example, organic solvents, ionic liquids or polymers.

In preferred embodiments, the electrolyte comprises an organic solvent, an ionic liquid and/or a polymer matrix.

In preferred embodiments, the organic solvent is selected from the group comprising ethylene carbonate, propylene carbonate, diethyl carbonate, dimethyl carbonate, ethyl methyl carbonate, acetonitrile, glutaronitrile, adiponitrile, pimelonitrile, gamma-butyrolactone, gamma-valerolactone, dimethoxyethane, 1,3-dioxolane, methyl acetate and/or mixture thereof. Preference is given to cyclic carbonates such as ethylene carbonate or propylene carbonate, and/or linear carbonates such as diethyl carbonate, dimethyl carbonate or ethyl methyl carbonate. The organic solvent is preferably selected from the group comprising ethylene carbonate, diethyl carbonate, dimethyl carbonate and/or mixtures thereof.

Preference is given to mixtures of ethylene carbonate and at least one further solvent, more preferably with diethyl carbonate or dimethyl carbonate. In preferred embodiments, the organic solvent is a mixture of ethylene carbonate and at least one further organic solvent, preferably diethyl carbonate. Preferably, the ratio of ethylene carbonate and the at least one further organic solvent, preferably diethyl carbonate, is in the range from ≥1:9 to ≤9:1, more preferably in the range from ≥3:7 to ≤7:3, preferably in the range from ≥3:7 to ≤1:1. Unless stated otherwise, the ratio is based on the proportions by weight of the solvents.

Further preferred solvents are ionic liquids. They have a high thermal and electrochemical stability, and also a high ionic conductivity. Preferred ionic liquids include a cation selected from the group comprising 1-ethyl-3-methylimidazolium ($EMI^+$), 1,2-dimethyl-3-propylimidazolium ($DMPI^+$), 1,2-diethyl-3,5-dimethylimidazolium ($DEDMI^+$), trimethyl-n-hexylammonium ($TMHA^+$), N-alkyl-N-methylpyrrolidinium ($PYR_{1R}^+$), N-alkyl-N-methylpiperidinium ($PIP_{1R}^+$) and/or N-alkyl-N-methylmorpholinium ($MORP_{1R}^+$), and an anion selected from the group comprising bis(trifluoromethanesulfonyl)imide ($TFSI^-$), bis(pentafluoroethanesulfonyl)imide ($BETI^-$), bis(fluorosulfonyl)imide ($FSI^-$), 2,2,2-trifluoro-N-(trifluoromethanesulfonyl) acetamide ($TSAC^-$), tetrafluoroborate ($BF_4^-$), pentafluoroethanetrifluoroborate ($C_2F_5BF_3^-$), hexafluorophosphate ($PF_6^-$) and/or tri(pentafluoroethane)trifluorophosphate ($(C_2F_5)_3PF_3^-$). Preferred N-alkyl-N-methylpyrrolidinium ($PYR_{1R}^+$) cations are selected from the group comprising N-butyl-N-methylpyrrolidinium ($PYR_{14}^+$) and/or N-methyl-N-propylpyrrolidinium ($PYR_{13}^+$). Preferred ionic liquids are selected from the group comprising N-butyl-N-methylpyrrolidinium bis(trifluoromethanesulfonyl) imide ($PYR_{14}TFSI$) and/or N-methyl-N-propylpyrrolidinium bis(trifluoromethanesulfonyl)imide ($PYR_{13}TFSI$).

Also suitable are polymer electrolytes, wherein the polymer electrolyte may be in the form of a gel polymer electrolyte or solid polymer electrolyte. Solid polyelectrolytes exhibit good properties with regard to the demands on future generations of accumulator. They enable a solvent-free structure which is easy to produce and may take various forms. Furthermore, the energy density can be enhanced, since the three-layer structure of electrolyte-separator-electrolyte can be dispensed with, such that only a thin polymer film is required between the electrodes. Solid electrolytes are generally chemically and electrochemically stable with respect to electrode materials and, moreover, do not escape from the cell. Gel polymer electrolytes usually comprise an organic solvent and a polymer matrix.

Preferred polymers for solid polymer electrolytes and gel polymer electrolytes are selected from the group comprising homo- or copolymers of polyethylene oxide (PEO), polypropylene oxide (PPO), polyvinylidene fluoride (PVdF), polyvinylidene fluoride-hexafluoro-propylene (PVdF-HFP), polyacrylonitrile (PAN), polymethylmethacrylate (PMMA), polyethylmethacrylate (PEMA), polyvinyl acetate (PVAc), polyvinyl chloride (PVC), polyphosphazenes, polysiloxanes, polyvinyl alcohol (PVA) and/or homo- and (block) copolymers comprising functional side chains selected from the group comprising ethylene oxide, propylene oxide, acrylonitrile and/or siloxanes.

In preferred embodiments, the lithium salt is selected from the group comprising $LiAsF_6$, $LiClO_4$, $LiSbF_6$, $LiPtCl_6$, $LiAlCl_4$, $LiGaCl_4$, $LiSCN$, $LiAlO_4$, $LiCF_3CF_2SO_3$, $Li(CF_3)SO_3$ (LiTf), $LiC(SO_2CF_3)_3$, phosphate-based lithium salts, preferably $LiPF_6$, $LiPF_3(CF_3)_3$ (LiFAP) and $LiPF_4(C_2O_4)$ (LiTFOB), borate-based lithium salts, preferably $LiBF_4$, $LiB(C_2O_4)_2$ (LiBOB), $LiBF_2(C_2O_4)$ (LiDFOB), $LiB(C_2O_4)(C_3O_4)$ (LiMOB), $Li(C_2F_5BF_3)$ (LiFAB) and $Li_2B_{12}F_{12}$ (LiDFB) and/or lithium salts of sulfonylimides, preferably $LiN(SO_2CF_3)_2$ (LiTFSI) and/or $LiN(SO_2C_2F_5)_2$ (LiBETI). A particularly preferred conductive lithium salt is $LiPF_6$ (lithium hexafluoro-phosphate).

The concentration of the lithium salt in the electrolyte is preferably in the range from ≥0.5 M to ≤2.5 M, preferably in the range from ≥0.65 M to ≤2 M, more preferably in the range from ≥0.8 M to ≤1.5 M, especially in the range from ≥0.9 M to ≤1.5 M. In an advantageous manner, such a concentration of the lithium salt in the electrolyte leads to a good conductivity.

For example, the concentration of the lithium salt in the electrolyte may be 0.9 M, and that of the at least one compound of the general formula (1) may be 0.1 M.

In a preferred embodiment, the electrolyte comprises a compound of the general formula (1), especially of the formula (2) or (3), at least one lithium salt, preferably $LiPF_6$, in a mixture of ethylene carbonate and at least one further solvent, more preferably diethyl carbonate or dimethyl carbonate, as solvent.

The electrolyte is preparable by introducing the lithium salt and the at least one compound of the general formula (1) into the solvent. For example, the lithium salt can first be dissolved in the solvent and then the compound of the general formula (1) can be added.

The electrolyte may further include at least one additive selected from the group comprising SEI (solid electrolyte interphase) formers or flame retardants.

The electrolyte is especially suitable for a battery or accumulator, especially as an electrolyte for a lithium ion battery or a lithium ion accumulator. More particularly, the electrolyte is suitable for use in a lithium-based energy storage means, preferably selected from the group comprising lithium batteries, lithium ion batteries, lithium ion accumulators, lithium-polymer batteries and/or lithium ion capacitors. The electrolyte is also suitable for use in lithium-based energy storage means which are referred to as further developments of the lithium ion accumulators, preferably selected from the group comprising lithium-titanate accumulators, lithium-air accumulators, lithium-manganese accumulators, lithium-iron-phosphate accumulators, lithium-iron-manganese-phosphate accumulators, lithium-iron-yttrium-phosphate accumulators, lithium-sulfur accumulators, lithium-nickel-cobalt-manganese-oxide accumulators, lithium-nickel-cobalt-aluminum-oxide accumulators and tin-sulfur-lithium accumulators.

Compounds of the general formula (1), especially of the compounds of the formulae (2) and (3), are usable as overcharging preventers in lithium-based energy storage means. More particularly, compounds of the general formula (1), especially of the compounds of the formulae (2) and (3), are usable as additives or an electrolyte additive for overcharging prevention for lithium-based energy storage means.

The present invention further provides a lithium-based energy storage means, preferably a lithium battery, lithium ion battery, lithium ion accumulator, lithium-polymer battery or lithium ion capacitor, comprising an electrolyte according to the invention.

The present invention further provides a lithium-based energy storage means, preferably a lithium battery, lithium ion battery, lithium ion accumulator, lithium-polymer battery or lithium ion capacitor, comprising a compound of the general formula (1), especially a compound of the formula (2) or (3).

The present invention further provides for the use of a compound of the general formula (1) as shown below

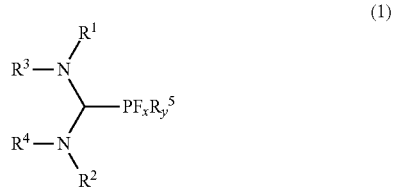

(1)

wherein:
- $R^1$, $R^2$ are the same or different and are each independently selected from the group comprising $C_{1-6}$-alkyl, $C_{3-7}$-cycloalkyl and/or $C_6$-$C_{10}$-aryl;
- $R^3$, $R^4$ are the same or different and are each independently $C_{1-6}$-alkyl, unsubstituted or mono- or polysubstituted by at least one substituent selected from the group comprising F, $C_{1-4}$-alkyl, carbonyl oxygen and/or $C_{1-4}$-alkoxy, or $R^3$ and $R^4$ form a saturated 5- or 6-membered ring which is unsubstituted or mono- or polysubstituted by at least one substituent selected from the group comprising F, $C_{1-4}$-alkyl, carbonyl oxygen and/or $C_{1-4}$-alkoxy;
- $R^5$ is linear or branched $C_{1-4}$-alkyl, unsubstituted or mono- or polysubstituted by fluorine;
- x is 3, 4 or 5;
- y is 0, 1 or 2, in electrolytes for primary or secondary electrochemical lithium-based energy storage means, preferably selected from the group comprising lithium batteries, lithium ion batteries, lithium ion accumulators, lithium-polymer batteries and/or lithium ion capacitors.

In an advantageous manner, by using a compound of the general formula (1), especially the compounds of the formulae (2) and (3), in an electrolyte, good prevention of overcharging can be provided.

Use of a compound of the general formula (1), especially the compounds of the formulae (2) and (3), as overcharging prevention in electrolytes for lithium-based energy storage means, for example as an additive or electrolyte additive, has a particular advantage that the normal charging and discharging processes and the normal battery operations are not adversely affected.

The invention further provides for the use of an electrolyte according to the invention in primary and secondary electrochemical lithium-based energy storage means, preferably selected from the group comprising lithium batteries, lithium ion batteries, lithium ion accumulators, lithium-polymer batteries and/or lithium ion capacitors, especially in a lithium ion battery or in a lithium ion accumulator.

The lithium-based energy storage means are suitable for all fields of use, especially also for larger systems such as in automobiles, or as stationary energy storage means for renewable energies.

BRIEF DESCRIPTION OF THE DRAWINGS

Examples and figures which serve to illustrate the present invention are given hereinafter.

The figures show.

DETAILED DESCRIPTION OF THE INVENTION

Example 1

Figure 1:
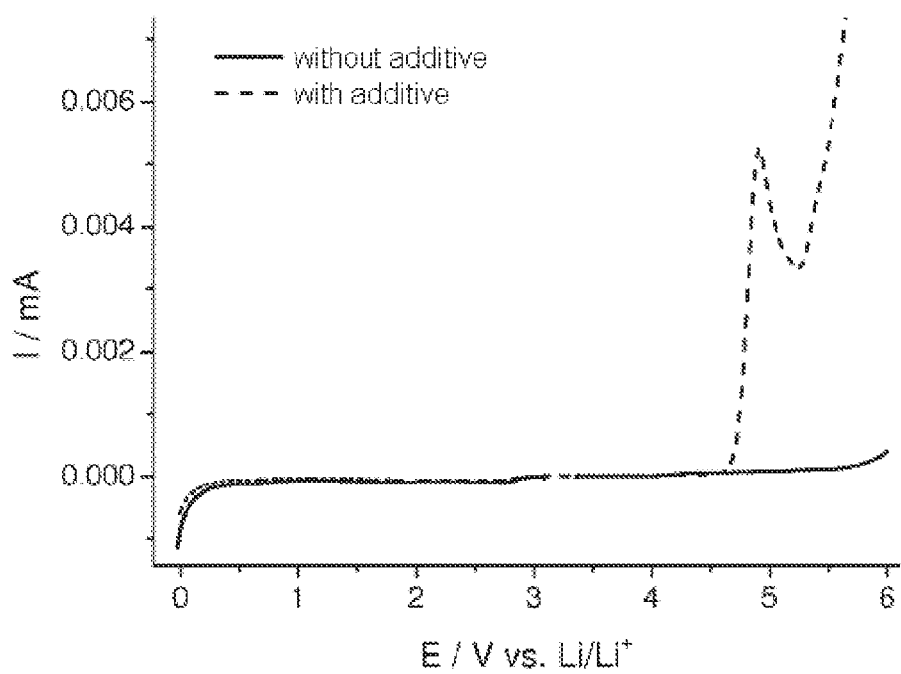
FIG. 1 shows the stability window of one embodiment of an inventive electrolyte comprising a mixture of ethyl carbonate and diethyl carbonate (EC:DEC 3:7) containing 0.9 M $LiPF_6$ and 0.1 M of the compound of the formula (2) compared to a mixture of ethyl carbonate and diethyl carbonate (EC:DEC 3:7) containing 1 M $LiPF_6$ on platinum. The plot is of the current density against the potential.

Preparation of the Compound of the Formula (2)

A solution of 0.30 g (2.2 mmol) of 2,2-difluoro-1,3-dimethylimidazolidine (ABCR) in 20 ml of diethyl ether (Roth) were introduced into a Schlenk trap with a Teflon-spindle tap and magnetic stirrer. At −196° C., 0.17 g (1.93 mmol) of $PF_3$ (ABCR) were condensed in. The trap was placed into a −40° C. ethanol cold bath, where it was brought to room temperature (18° C.-23° C.) while stirring within 12 hours. The volatile constituents were drawn off under reduced pressure and the remaining solid was washed with small portions of x3 ml of demineralized water at 10° C. After drying, the compound of the formula (2) was obtained in solid form.

The compound of the formula (2) was dried at a temperature of 80° C. with the aid of a rotary vane pump (Pfeiffer Vacuum) for 24 hours.

Example 2

Preparation of the Compound of the Formula (3)

The compound of the formula (3) was prepared as specified in example 1, except that 0.31 g (2.24 mmol) of bis(dimethylamino)difluoromethane (ABCR) was used as starting compound.

Example 3

Determination of the Stability Window of the Compound of the Formula (2)

To examine the stability window, the compound of the formula (2) prepared according to example 1 was added to an electrolyte and analyzed against an electrolyte without addition.

Two mixtures each of 30% by weight of ethyl carbonate (EC) (Ferro Corporation, "battery grade" purity) and 70% by weight of diethyl carbonate (DEC) (Ferro Corporation, battery grade) (EC:DEC, 3:7) were provided. The required amount of $LiPF_6$ (Sigma-Aldrich, battery grade) was dissolved in one solvent mixture, so as to result in a concentration of 0.9 M of $LiPF_6$, and additionally 0.1 M of the compound of the formula (2) prepared according to example 1. For a comparative electrolyte, the required amount of $LiPF_6$ (Sigma-Aldrich, battery grade) was dissolved in the second solvent mixture, so as to result in a concentration of 1M $LiPF_6$.

The electrochemical stability was determined by means of linear sweep voltammetry (LSV). In this process, there is a continuous alteration in the electrode voltage (linear sweep). The experiments were conducted in a 3-electrode arrangement in modified Swagelok® T-pieces (tube connector, stainless steel body) with a platinum electrode (eDAQ, model: ET075, diameter 1 mm) as working electrode and lithium foil (diameter 12 mm or 7 mm, Chemetall) as counterelectrode and reference electrode. In addition, the cell body was lined with a polyester film siliconized on one side (Mylar®, PPI-SP 914, 100 μm) and the electrodes were introduced into the cell body. The electrodes were separated by a nonwoven fabric (Freudenberg®, FS2226E, 6 plies) which had been impregnated with the corresponding electrolyte. To determine the oxidative stability, the potential between working electrode and reference electrode was increased from the open-circuit potential to 6 V. To determine the reductive stability, the potential between working electrode and reference electrode was lowered from the open-circuit potential to −0.025 V. The scan rate was 1 mV $s^{-1}$.

As shown in FIG. 1, the cell having the electrolyte containing 0.1 M of the compound of the formula (2), when the potential is increased within the lower potential range up to 4.5 V, showed no differences from the comparative electrolyte, while the current density rose at a potential of about 4.6 V vs. $Li/Li^+$. This shows that the oxidation reaction of the compound of the formula (2) commenced at about 4.6 V. In this way, from a potential of about 4.6 V, the charging current density was used for the reaction of the additive. Thus, overcharging of the cell was prevented.

Especially when the potential was lowered, no reduction reaction which would indicate a shuttle mechanism was observed, since no rise in the current density was visible up to about 0 V. This shows that the oxidation of the compound of the formula (2) is an irreversible reaction and the compound of the formula (2) belongs to the group of the non-redox shuttle additives.

Example 4

Cyclic Voltammetry

The electrolyte was prepared by providing 30% by weight of ethyl carbonate (EC) (Ferro Corporation, "battery grade" purity) and 70% by weight of diethyl carbonate (DEC) (Ferro Corporation, battery grade) (EC:DEC, 3:7) and dissolving the required amount of $LiPF_6$ (Sigma-Aldrich, battery grade) in this solvent mixture, so as to result in a concentration of 0.9 M $LiPF_6$. Additionally dissolved in the mixture was the compound of the formula (2) prepared according to example 1 in a concentration of 0.1 M.

The repeatability of the oxidation reaction of the compound of the formula (2) was checked by cyclic voltammetry. The measurements were conducted in a 3-electrode arrangement in modified Swagelok® T-pieces (tube connector, stainless steel body) with a platinum electrode (eDAQ, model: ET075, diameter 1 mm) as working electrode and lithium foil (diameter 12 mm or 7 mm, Chemetall) as counterelectrode and reference electrode. In addition, the cell body was lined with a polyester film siliconized on one side (Mylar®, PPI-SP 914, 100 μm) and the electrodes were introduced into the cell body. The electrodes were separated by a nonwoven fabric (Freudenberg®, FS2226E, 6 plies) which had been impregnated with the corresponding electrolyte.

The potential between working electrode and reference electrode was increased in the first cycle from the open-circuit potential to 5 V and then reduced to 3 V. In the second cycle, the potential was increased to 5 V, followed by a reduction in the potential to 4 V. In cycles 3 to 11, the potential was increased from 4 V to 5 V and then reduced again to 4 V. In the last cycle, the potential, after the increase to 5 V, was reduced to 3 V. The scan rate was always 1 mV $s^{-1}$.

Figure 2:
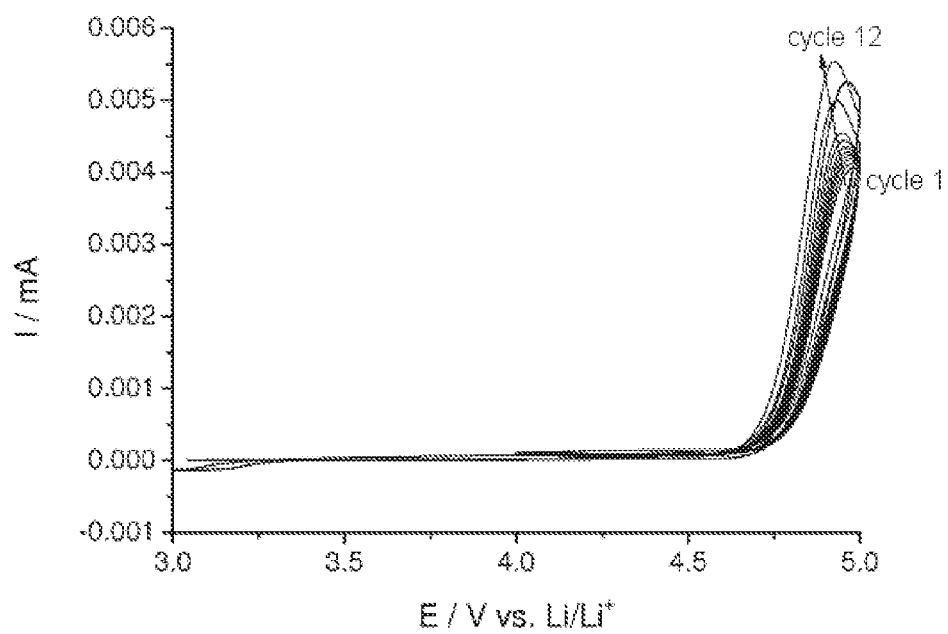
FIG. 2 shows a cyclic voltammogram of the use of 0.1 M of the compound of the formula (2) in an electrolyte solution containing 0.9 M $LiPF_6$ in a mixture of ethyl carbonate and diethyl carbonate (EC:DEC 3:7) on platinum. The plot is of the current density against the potential.

As shown in FIG. 2, the current density of the electrolyte containing 0.1 M of the compound of the formula (2) rose again at a potential of about 4.6 V vs. $Li/Li^+$ in each of the 12 cycles shown. This cyclic voltammetry thus shows that the oxidation reaction of the compound of the formula (2) was repeatable. The additive was decomposed until the potential was lowered again.

Example 5

Overcharging Experiment

The electrochemical behavior of the compound of the formula (2) on overcharging was tested in an ($Li[Ni_{1/3}Mn_{1/3}Co_{1/3}]O_2$) (NMC)/Li half-cell.

The electrolyte was prepared by providing 30% by weight of ethyl carbonate (EC) (Ferro Corporation, "battery grade" purity) and 70% by weight of diethyl carbonate (DEC) (Ferro Corporation, battery grade) (EC:DEC, 3:7) and dissolving the required amount of LiPF$_6$ (Sigma-Aldrich, battery grade) in this solvent mixture, so as to result in a concentration of 0.9 M LiPF$_6$. Additionally dissolved in the mixture was the compound of the formula (2) prepared according to example 1 in a concentration of 0.1 M.

The overcharging experiments were conducted in a 3-electrode cell (modified Swagelok® T-pieces, stainless steel body) with NMC (Toda Kogyo Europe, diameter 12 mm) as working electrode, and lithium metal as counterelectrode (diameter 12 mm) and reference electrode (diameter 7 mm). In addition, the cell body was lined with a polyester film siliconized on one side (Mylar®, PPI-SP 914, 100 µm) and the electrodes were introduced into the cell body. The electrodes were separated by a nonwoven fabric (Freudenberg®, FS2226E, 6 plies) which had been impregnated with the corresponding electrolyte.

The cells were charged and discharged at a constant current of 0.1 C. In the first cycle, charging was effected proceeding from the open-circuit potential to a potential of 4.3 V, followed by discharging down to a potential of 3.0 V. In the second cycle, charging was effected up to a potential of 4.3 V, and discharging down to 3.6 V. In the subsequent cycle, the cutoff potential was increased to 4.8 V and discharging was effected to 3 V. In the following 2 cycles, the cells were cycled in a potential range from 3.0 to 4.6 V.

Subsequently, the potential was increased once again to 4.8 V, followed by two cycles between 3.0 and 4.6 V. In the last cycle, the potential was increased to 5.0 V.

Figure 3:
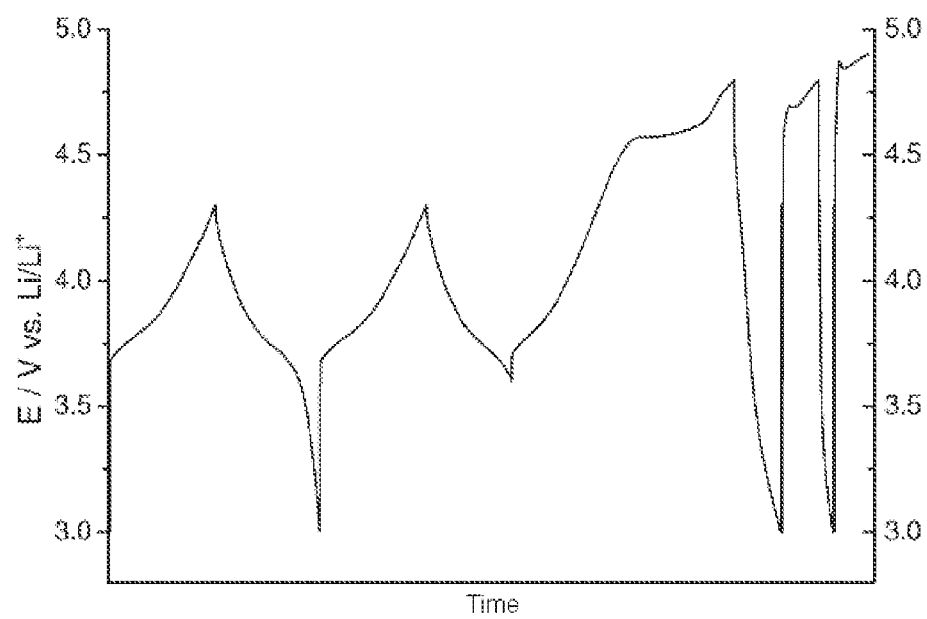
FIG. 3 shows an overcharging experiment in an NMC/Li half-cell in an electrolyte solution containing 0.9 M $LiPF_6$ and 0.1 M of a compound of the formula (2) in a mixture of ethyl carbonate and diethyl carbonate (EC:DEC 3:7). The plot is of the potential against time.

FIG. 3 shows the potential plot of the battery. In the first two cycles, a cutoff potential of 4.3 V was selected. As can be inferred from FIG. 3, the plot of the potential against time shows potential peaks in the first two cycles. This shows that no adverse effect of the additive on the cycling is apparent. In the third cycle, charging was effected up to a higher potential of 4.8 V, with a noticeable plateau at about 4.6 V. This plateau shows the reaction of the compound of the formula (2), since it was oxidized instead of the NMC cathode material and hence prevents a further rise in the potential. Only after a certain period of time did the potential rise again. This rise may be caused by the consumption of the compound in the immediate environment of the cathode surface or a rise in the internal resistance. Later, the potential plot of the cell shows that no further cycling was possible within the normal potential range between 3 V and 4.3 V. This shows that the battery operation was stopped.

Only in the case of further overcharging experiments in the sixth and ninth cycles did the oxidation of the additive set in again. In this way, overcharging of the cell can be prevented.

Example 6

Determination of the Cycling Behavior of the Electrolyte Containing 0.1 M of the Compound of the Formula (2)

In order to rule out any adverse effect of the compound of the formula (2) on the normal operation of a lithium ion cell, an NMC/graphite cell was tested with and without additive.

A solution of 0.9 M of LiPF$_6$ (Sigma-Aldrich, battery grade) and 0.1 M of the compound of the formula (2) prepared according to example 1 in a mixture of 30% by weight of ethyl carbonate (EC) (Ferro Corporation, "battery grade" purity) and 70% by weight of diethyl carbonate (DEC) (Ferro Corporation, battery grade) (EC:DEC, 3:7) was used. The comparative electrolyte used was a 1 M solution of LiPF$_6$ (Sigma-Aldrich, battery grade) in a mixture of 30% by weight of ethyl carbonate (EC) (Ferro Corporation, "battery grade" purity) and 70% by weight of diethyl carbonate (DEC) (Ferro Corporation, battery grade) (EC:DEC, 3:7).

The cycling behavior was conducted in 2-electrode cells (modified Swagelok® T-pieces, stainless steel body) with NMC (Li[Ni$_{1/3}$Mn$_{1/3}$Co$_{1/3}$]O$_2$) (Toda Kogyo Europe, diameter 12 mm) as cathode and graphite (Timrex T44, TIMCAL Graphite & Carbon, diameter 12 mm) as anode. In addition, the cell body was lined with a polyester film siliconized on one side (Mylar®, PPI-SP 914, 100 µm) and the electrodes were introduced into the cell body. The electrodes were separated by a nonwoven fabric (Freudenberg®, FS2226E, 6 plies) which had been impregnated with the corresponding electrolyte.

The cells were first charged and discharged at a constant current of 1 C for 20 cycles within a potential range between 2.8 V and 4.2 V. Subsequently, a C rate test was conducted, in which charging is effected in each case at a C rate of 1 C and discharging at different C rates from C/10 to 5 C. After the C rate test, the cells were charged and discharged at 1 C for a further 80 cycles.

Figure 4:
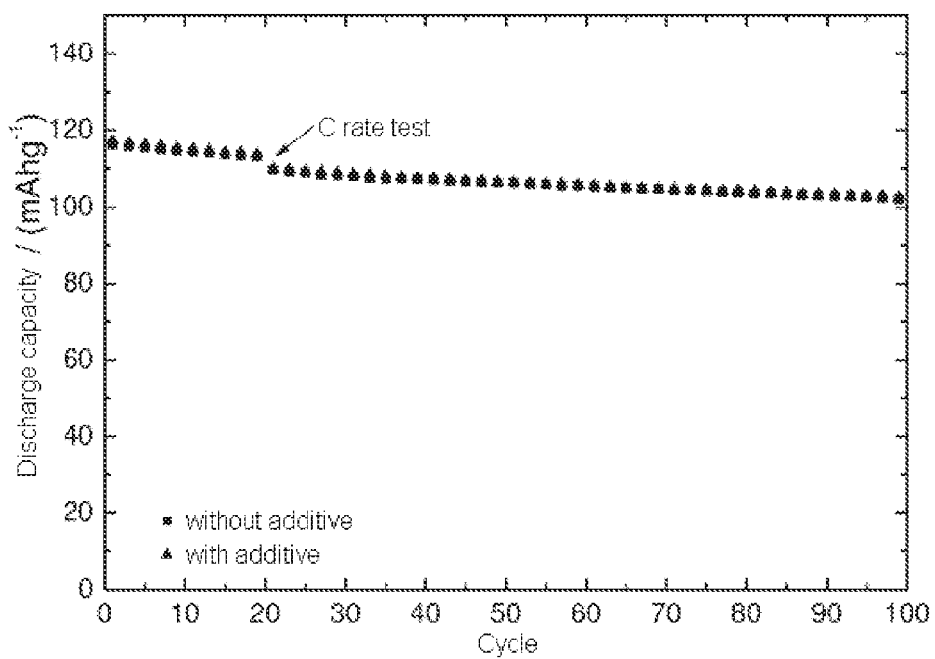
FIG. 4 shows a constant current density cycling of an NMC/graphite cell charged at a C rate of 1C in electrolytes of a mixture of ethyl carbonate and diethyl carbonate (EC:DEC 3:7) containing 1 M $LiPF_6$ or 0.9 M $LiPF_6$ and 0.1 M of the compound of the formula (2) as additive.

FIG. 4 shows the discharge capacity against the number of cycles of the NMC/graphite cell charged at a C rate of 1 C for the electrolyte containing 0.9 M LiPF$_6$ and 0.1 M of the compound of the formula (2) in a mixture of ethyl carbonate and diethyl carbonate (EC:DEC 3:7) and the comparative electrolyte containing 1 M LiPF$_6$ in the same solvent mixture.

It was found here that the cell with the electrolyte containing 0.1 M of the compound of the formula (2) had the same discharge capacity over the entire range as that with the comparative electrolyte.

Figure 5:
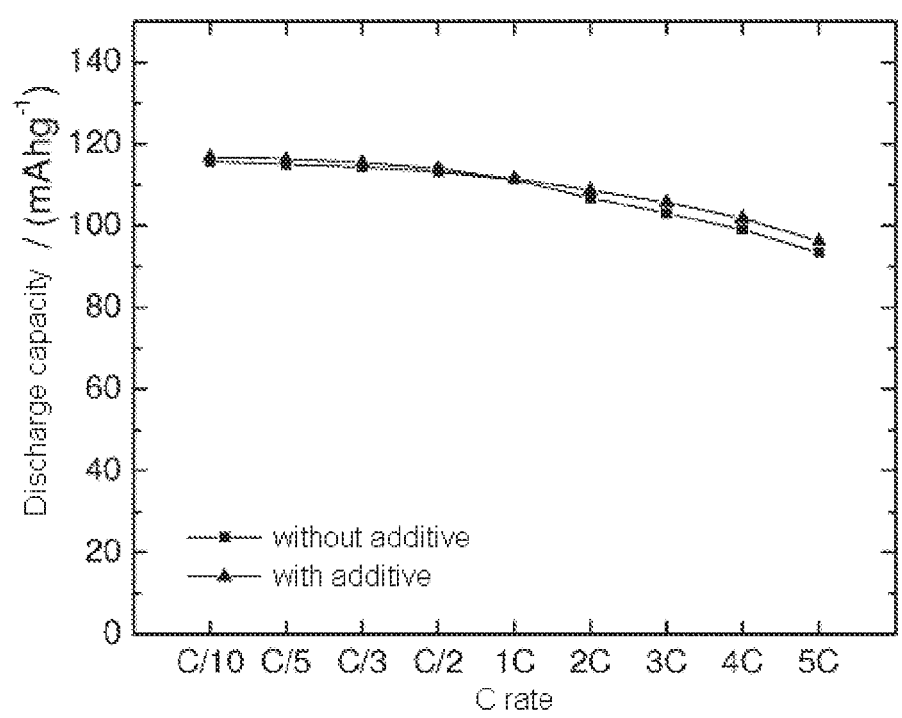
FIG. 5 shows a C rate test of an NMC/graphite cell charged at a C rate of 1C and discharged at various C rates in electrolytes of a mixture of ethyl carbonate and diethyl carbonate (EC:DEC 3:7) containing 1 M $LiPF_6$ or 0.9 M $LiPF_6$ and 0.1 M of the compound of the formula (2) as additive.

FIG. 5 shows the C rate test. The discharge capacity is plotted against the different C rates for the electrolyte containing 0.9 M LiPF$_6$ and 0.1 M of the compound of the formula (2) in a mixture of ethyl carbonate and diethyl carbonate (EC:DEC 3:7) and the comparative electrolyte containing 1 M LiPF$_6$ in the same solvent mixture. In this figure too, no difference was found in the use of the electrolyte containing 0.1 M of the compound of the formula (2) compared to the comparative electrolyte.

This shows that the presence of 0.1 M of the compound of the formula (2) in the electrolyte affects neither the attainable capacities and the cycling stability nor the C rate capability of the NMC/graphite cells within the normal potential range from 2.8 V to 4.2 V, and hence had no adverse effect on the normal operation of a lithium ion cell.

Example 7

Determination of the Cycling Characteristics of the Electrolyte Containing 0.1 M of the Compound of the Formula (2) Over 50 Cycles The overcharging test for the electrolyte containing 0.9 M LiPF$_6$ and 0.1 M of the compound of the formula (2) in a mixture of ethyl carbonate and diethyl carbonate (EC:DEC 3:7) was repeated as described in example 6 for 50 cycles. For this purpose, the cells were first charged and discharged at a constant current of 1 C for 50 cycles within a potential range between 2.8 V and 4.2 V. In the following cycle, the cutoff potential was increased to 4.8 V and, in the subsequent 20 cycles, reduced again to 4.2 V.

Figure 6:
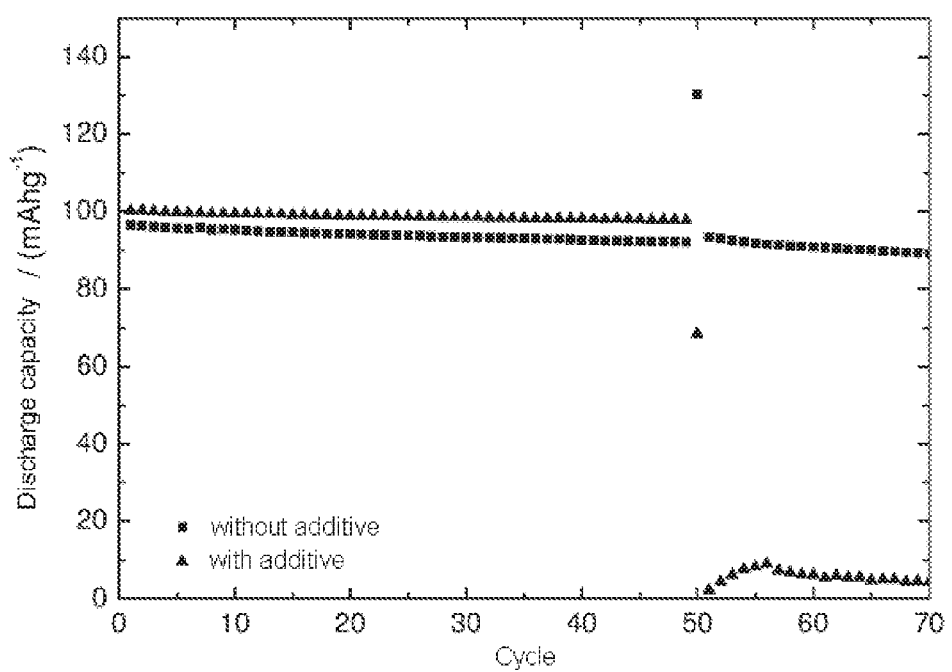
FIG. 6 shows a further constant current density cycling of an NMC/graphite cell charged at a C rate of 1C in electrolytes of a mixture of ethyl carbonate and diethyl carbonate (EC:DEC 3:7) containing 1 M $LiPF_6$ or 0.9 M $LiPF_6$ and 0.1 M of the compound of the formula (2) as additive over 50 cycles. The plot is of the discharge capacity in $mAhg^{-1}$ against the number of cycles.

FIG. 6 shows the discharge capacity in mAhg$^{-1}$ against the number of cycles of the NMC/graphite cell charged at a C rate of 1 C for the electrolyte containing 0.9 M LiPF$_6$ and 0.1 M of the compound of the formula (2) in a mixture of ethyl carbonate and diethyl carbonate (EC:DEC 3:7) and the comparative electrolyte containing 1 M LiPF6 in the same solvent mixture.

It was found that the cell with the electrolyte containing 0.1 M of the compound of the formula (2) did not have any significant difference from the comparative electrolyte within the potential range from 2.8 V to 4.2 V. Overcharging in the subsequent cycle resulted in a drop in the capacity and stoppage of the battery operation, whereas the battery operation was not stopped in the case of the comparative electrolyte.

The invention claimed is:

1. An electrolyte for a lithium-based energy storage means, comprising at least one lithium salt, a solvent and at least one compound of the general formula (1) as shown below

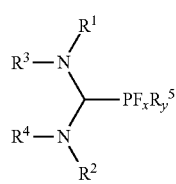
(1)

wherein:
R$^1$,R$^2$ are the same or different and are each independently selected from the group comprising C$_{1-6}$-alkyl, C$_{3-7}$-cycloalkyl and/or C$_6$-C$_{10}$-aryl;
R$^3$, R$^4$ are the same or different and are each independently C$_{1-6}$-alkyl, unsubstituted or mono- or polysubstituted by at least one substituent selected from the group comprising F, C$_{1-4}$-alkyl, carbonyl oxygen and/or C$_{1-4}$-alkoxy, or R$^3$ and R$^4$ form a saturated 5- or 6-membered ring which is unsubstituted or mono- or polysubstituted by at least one substituent selected from the group comprising F, C$_{1-4}$-alkyl, carbonyl oxygen and/or C$_{1-4}$-alkoxy;
R$^5$ is linear or branched C$_{1-4}$-alkyl, unsubstituted or mono- or polysubstituted by fluorine;
x is 3, 4 or 5;
y is 0, 1 or 2.

2. The electrolyte according to claim 1, characterized in that R$^1$ and R$^2$ are the same or different and are each independently linear or branched C$_{1-4}$-alkyl.

3. The electrolyte according to claim 1, characterized in that R$^3$ and R$^4$ are the same or different and are each independently linear or branched C$_{1-4}$-alkyl.

4. The electrolyte according to claim 1, characterized in that R$^5$ is selected from the group comprising CH$_3$, CH$_2$F, CHF$_2$, CF$_3$, C$_2$H$_5$, C$_2$H$_4$F, C$_2$H$_3$F$_2$, C$_2$H$_2$F$_3$, C$_2$HF$_4$ and/or C$_2$F$_5$.

5. The electrolyte according to claim 1, characterized in that the at least one compound of the general formula (1) is selected from the group comprising compounds of the formulae (2) and/or (3) below:

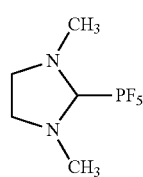
(2)

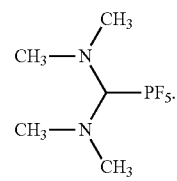
(3)

6. The electrolyte according to claim 1, characterized in that the concentration of the at least one compound of the general formula (1) in the electrolyte is in the range from ≥0.001 M to ≤1 M.

7. The electrolyte according to claim 1, characterized in that the electrolyte comprises an organic solvent, an ionic liquid and/or a polymer matrix.

8. The electrolyte according to claim 1, characterized in that the lithium salt is selected from the group comprising LiAsF$_6$, LiClO$_4$, LiSbF$_6$,LiPtCl$_6$, LiAlCl$_4$, LiGaCl$_4$, LiSCN, LiAlO$_4$, LiCF$_3$CF$_2$SO$_3$, Li(CF$_3$)SO$_3$, LiC(SO$_2$CF$_3$)$_3$, phosphate-based lithium salts, preferably LiPF$_6$, LiPF$_3$(CF$_3$)$_3$ and LiPF$_4$(C$_2$O$_4$), borate-based lithium salts, preferably LiBF$_4$, LiB(C$_2$O$_4$)$_2$, LiBF$_2$(C$_2$O$_4$), LiB(C$_2$O$_4$)(C$_3$O$_4$), Li(C$_2$F$_5$BF$_3$) and Li$_2$B$_{12}$F$_{12}$ and/or lithium salts of sulfonylimides, preferably LiN(SO$_2$CF$_3$)$_2$ and/or LiN(SO$_2$C$_2$F$_5$)$_2$.

9. A lithium-based energy storage means, preferably lithium battery, lithium ion battery, lithium ion accumulator, lithium-polymer battery or lithium ion capacitor, comprising an electrolyte according to claim 1.

10. A method of preventing overcharging in a primary or secondary electrochemical lithium-based energy storage means, the method comprising the step of providing an electrolyte comprising a compound of the general formula (1) as shown below

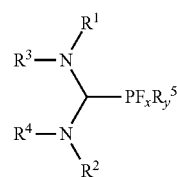
(1)

wherein:
R$^1$, R$^2$ are the same or are each independently selected from the group comprising C$_{1-6}$-alkyl, C$_{3-7}$-cycloalkyl and/or C$_6$-C$_{10}$-aryl;
R$^3$, R$^4$ are the same or different and are each independently C$_{1-6}$-alkyl, unsubstituted or mono- or polysubstituted by at least one substituent selected from the group comprising F, C$_{1-4}$-alkyl, carbonyl oxygen and/or C$_{1-4}$-alkoxy, or R$^3$ and R$^4$ form a saturated 5- or 6-membered ring which is unsubstituted or mono- or polysubstituted by at least one substituent selected from the group comprising F, C$_{1-4}$-alkyl, carbonyl oxygen and/or C$_{1-4}$-alkoxy;
R$^5$ is linear or branched C$_{1-4}$-alkyl, unsubstituted or mono- or polysubstituted by fluorine;
x is 3, 4 or 5;
y is 0, 1 or 2.

11. The method of claim 10, wherein the primary or secondary electrochemical lithium-based energy storage means is selected from the group comprising lithium batteries, lithium ion batteries, lithium ion accumulators, lithium-polymer batteries and/or lithium ion capacitors.

12. The method of claim 10, wherein the method prevents overcharging in a secondary electrochemical lithium-based energy storage means.

13. The electrolyte according to claim 1, characterized in that $R^1$ and $R^2$ are the same or different and are each independently linear or branched $C_{1-2}$-alkyl.

14. The electrolyte according to claim 1, characterized in that $R^3$ and $R^4$ are the same or different and are each independently linear or branched $C_{1-2}$-alkyl.

15. The electrolyte according to claim 1, characterized in that $R^3$ and $R^4$ form a saturated 5- or 6-membered ring which is unsubstituted or mono- or polysubstituted by at least one substituent selected from the group comprising F and/or $C_{1-4}$-alkyl.

16. The electrolyte according to claim 1, characterized in that $R^5$ is selected from the group comprising $CH_3$ and/or $CF_3$.

17. The electrolyte according to claim 1, characterized in that the concentration of the at least one compound of the general formula (1) in the electrolyte is in the range from ≥0.01 M to ≤0.5 M.

18. The electrolyte according to claim 1, characterized in that the concentration of the at least one compound of the general formula (1) in the electrolyte is in the range from ≥0.05 M to ≤0.2 M.

19. The electrolyte according to claim 7, characterized in that the organic solvent is selected from the group comprising ethylene carbonate, propylene carbonate, diethyl carbonate, dimethyl carbonate, ethyl methyl carbonate, acetonitrile, glutaronitrile, adiponitrile, pimelonitrile, gamma-butyrolactone, gamma-valerolactone, dimethoxyethane, 1,3-dioxolane, methyl acetate and/or mixture thereof, preferably from the group comprising ethylene carbonate, diethyl carbonate, dimethyl carbonate and/or mixtures thereof.

20. The electrolyte according to claim 7, characterized in that the organic solvent is selected from the group comprising ethylene carbonate, diethyl carbonate, dimethyl carbonate and/or mixtures thereof.

* * * * *